United States Patent [19]

St. John et al.

[11] Patent Number: 5,581,566
[45] Date of Patent: Dec. 3, 1996

[54] HIGH-PERFORMANCE PARALLEL INTERFACE TO SYNCHRONOUS OPTICAL NETWORK GATEWAY

[75] Inventors: Wallace B. St. John; David H. DuBois, both of Los Alamos, N.M.

[73] Assignee: The Regents of the Univ. of California Office of Technology Transfer, Alameda, Calif.

[21] Appl. No.: 369,833

[22] Filed: Jan. 6, 1995

[51] Int. Cl.⁶ .................................................. G06F 11/10
[52] U.S. Cl. ...................................... 371/37.6; 371/49.1
[58] Field of Search ................................... 395/575, 200, 395/275, 325, 182.16, 183.22, 181, 185.01, 184.01, 200.13, 200.20, 821; 370/84, 94.2, 100.1, 105.4, 105.5, 106; 340/825.14, 825.2; 371/40.1, 32.6, 48, 49.1, 49.2; 375/38

[56] References Cited

U.S. PATENT DOCUMENTS

| | | | |
|---|---|---|---|
| 4,775,987 | 10/1988 | Miller | 375/38 |
| 4,805,167 | 2/1989 | Leslie et al. | 370/84 |
| 4,809,273 | 2/1989 | Jackowski et al. | 371/3 |
| 4,970,714 | 11/1990 | Chen et al. | 371/32 |
| 4,989,206 | 1/1991 | Dunphy et al. | 371/10.1 |
| 5,058,133 | 10/1991 | Duncanson | 375/38 |
| 5,065,396 | 12/1991 | Castellano et al. | 370/84 |
| 5,068,854 | 11/1991 | Chandran et al. | 371/37.1 |
| 5,130,992 | 7/1992 | Frey, Jr. et al. | 371/40.1 |
| 5,134,619 | 7/1992 | Henson et al. | 371/40.1 |
| 5,185,736 | 2/1993 | Tyrrell et al. | 370/55 |
| 5,208,813 | 5/1993 | Stallmo | 371/10.1 |
| 5,218,677 | 6/1993 | Bono et al. | 395/275 |
| 5,231,649 | 7/1993 | Duncanson | 375/38 |
| 5,404,452 | 4/1995 | Detschel et al. | 395/250 |
| 5,410,600 | 4/1995 | Toy | 380/9 |
| 5,414,707 | 5/1995 | Johnston et al. | 370/79 |

OTHER PUBLICATIONS

Jay Duncanson, "Inverse Multiplexing," IEEE Communications Magazine, pp. 34–41 (Apr. 1994).

*Primary Examiner*—Robert W. Beausoliel, Jr.
*Assistant Examiner*—Albert Décady
*Attorney, Agent, or Firm*—Ray G. Wilson

[57] ABSTRACT

A system of sending and receiving gateways interconnects high speed data interfaces, e.g., HIPPI interfaces, through fiber optic links, e.g., a SONET network. An electronic stripe distributor distributes bytes of data from a first interface at the sending gateway onto parallel fiber optics of the fiber optic link to form transmitted data. An electronic stripe collector receives the transmitted data on the parallel fiber optics and reforms the data into a format effective for input to a second interface at the receiving gateway. Preferably, an error correcting syndrome is constructed at the sending gateway and sent with a data frame so that transmission errors can be detected and corrected in a real-time basis. Since the high speed data interface operates faster than any of the fiber optic links the transmission rate must be adapted to match the available number of fiber optic links so the sending and receiving gateways monitor the availability of fiber links and adjust the data throughput accordingly. In another aspect, the receiving gateway must have sufficient available buffer capacity to accept an incoming data frame. A credit-based flow control system provides for continuously updating the sending gateway on the available buffer capacity at the receiving gateway.

10 Claims, 6 Drawing Sheets

HIGH-PERFORMANCE PARALLEL INTERFACE TO SYNCHRONOUS OPTICAL NETWORK GATEWAY

BACKGROUND OF THE INVENTION

This invention relates to high speed long distance computer networking and, more particularly, to a system for transmitting data from an interface having a first bandwidth over transmission links having a second bandwidth less than the first bandwidth. This invention was made with government support under Contract No. W-7405-ENG-36 awarded by the U.S. Department of Energy. The government has certain rights in the invention.

The High-Performance Parallel Interface (HIPPI) is an interconnection system capable of 800 Mbit/s or 1600 Mbit/s data transfer rates. Local area HIPPI networks can be formed with operating speeds in excess of 20 Gbit/s. Operating protocols for this high speed performance have been established; see, e.g., Tolmie, "High-Performance Parallel Interface (HIPPI)," Chapter 6 in *High Performance Networks-Technology and Protocols*, A. Tantawy ed. 1994 (Academic Publishers, Norwell, Mass.). A serial HIPPI protocol has been established for fiber optic media up to 10 km in length and copper coaxial cable up to 36 meters in length.

SONET is being developed for long distance communication over optical fiber networks. SONET specifications (see, e.g., ANSI T1.105-1988, "Digital Hierarchy Optical Interface Rates and Formats Specification;" ANSI T1.106-1988, "Digital Hierarchy Optical Interface Specifications: Single-Mode;" Bellcore Technical Reference TR-NWT-000253, Issue 2, December 1991) define a digital hierarchy for fiber optic transmission and a frame structure for multiplexing digital traffic. The basic rate is known as the Synchronous Transport Signal Level 1 (STS-1), which corresponds to 51.84 Mbit/s. Integer multiples of STS-1 are defined by the hierarchy (e.g., STS-3 multiplexes three STS-1 tributaries to yield 155.52 Mbit/s). The most popular rates are STS-3, STS-12 (622.08 Mbit/s), and STS-48(2488.32 Mbit/s).

For each defined rate, a portion of each data frame is dedicated to overhead with the balance being available for data payload. For STS-1, the payload capacity is 49.536 Mbit/s. For higher level services, SONET defines "concatenated" hierarchical signals, where STS-1's are combined to provide the higher capacity. However, the overhead of a concatenated level is less than the overhead of the combined STS-1's; e.g., a STS-3C signal can carry a payload of 149.76 Mbit/s vs. 148.608 Mbit/s for three individual STS-1 signals. For each STS signal rate in the hierarchy, there is defined an optical stream carrying that payload, known as the Optical Carrier (OC), where, e.g., OC-3 carries one STS-3C.

For long distance networking of local HIPPI systems, it is a requirement to interface to a transmission methodology that is supported by a commercial telecommunications carrier. Such carriers already have an infrastructure to move large amounts of data on an international scale. A suitable standard for long-haul transmission is SONET and one embodiment of the present invention provides a gateway that adapts HIPPI networking to SONET telecommunications. There are available integrated circuits (ICs), e.g., available from Bellcore and Transwitch, that provide an interface to fiber optic modules complying with the SONET specification at the OC-3 rate. These IC convert 8-bit (1 byte) data to a serial stream and convert serial SONET data to bytes. As discussed below, HIPPI can support nearly 100 Mbytes/s, or nearly the capacity of six STS-3C's (1.2 Gbit/s).

It will be appreciated that communications between high speed data gateways, e.g., HIPPI gateways, will introduce some limitations. One limitation is that the data transmission rate is limited to the number of available channels. For example, each SONET STS-1 data payload is 49.536 Mbit/s. Since SONET is a synchronous system that continually transmits and receives data, the total available data payload on the provided channels cannot be exceeded.

The transmission of data for processing also requires that the receiving gateway have the capability for receiving the data. If adequate buffer space is not available, data will be lost or corrupted in the transmission process.

It should be noted that there will be some errors in data transmission at these transmission rates, albeit at low rates, generally. It is important to recognize data transmission errors before accepting the data for further processing. While data words with such errors can be discarded, it would be desirable if some error recognition and correction could be done on-line so that signal flow would be minimally interrupted by an error.

Accordingly, it is an object of the present invention to provide a network for full bandwidth transmission of a wide bandwidth data output over lower bandwidth transmission elements.

Another object of the present invention is to provide some on-line error detection and correction.

Still another object of the present invention is to provide a HIPPI input in a format for use by a long distance optical fiber link.

One other object of the present invention, is to provide for data flow control to assure that adequate buffer storage exists to accept transferred data.

Yet another object of the present invention is to adjust the transmission data rate to the number of available transmission channels.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a system of sending and receiving gateways interconnecting high speed data interfaces, e.g., HIPPI interfaces, through fiber optic links, e.g., a SONET network. An electronic stripe distributor distributes bytes of data from a first interface at the sending gateway onto parallel fiber optics of the fiber optic link to form transmitted data. An electronic stripe collector receives the transmitted data on the parallel fiber optics and reforms the data into a format effective for input to a second interface at the receiving gateway. Preferably, an error correcting syndrome is constructed at the sending gateway and sent with a data frame so that transmission errors can be detected and corrected in a real-time basis. Since the high speed data interface operates faster than any of the fiber optic links the transmission rate must be adapted to match the available number of fiber optic links so the sending and receiving gateways monitor the availability of fiber links and adjust the data throughput accordingly. In another aspect, the receiving gateway must have sufficient available buffer capacity to accept an incoming data frame. A credit-based flow control system provides for continuously updating the sending gateway on the available buffer capacity at the receiving gateway.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
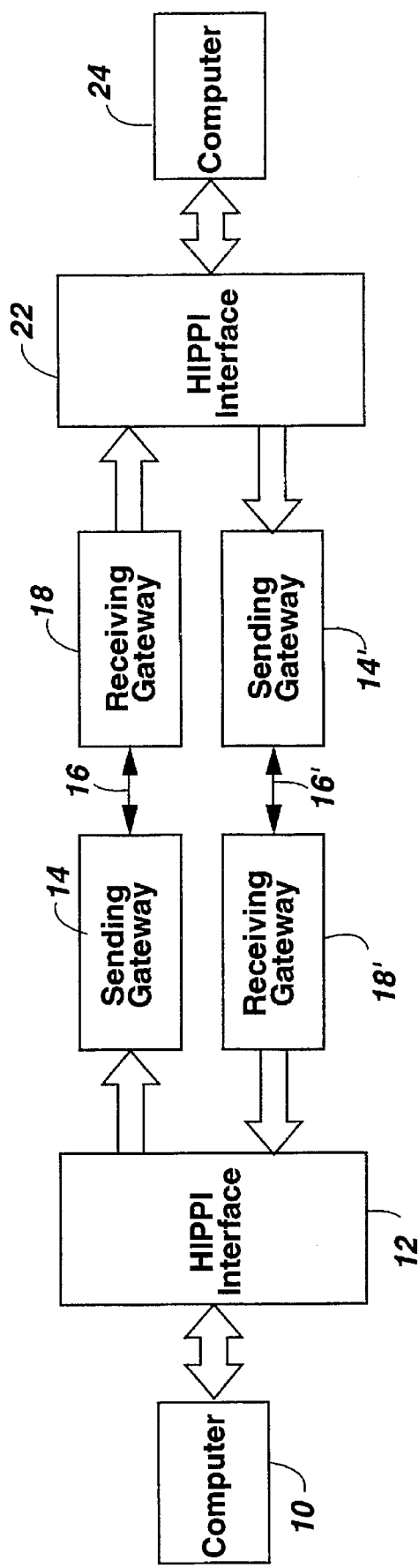
FIG. 1 is a block diagram of a HIPPI-SONET wide-area network.

FIG. 1 generally depicts in block diagram form a wide-area network for long distance communication between high-performance computers. A first computer 10 communicates with, e.g. HIPPI interface 12, as described in St. John, supra. When data is to be transmitted, HIPPI interface 12 provides the data in a parallel HIPPI format to sending gateway 14. Note that multiple computers at a single location do not require individual sending gateways. A HIPPI switch may be utilized wherein each computer shares a single HIPPI interface on one sending gateway. Sending gateway 14 prepares the parallel format data to a serial format compatible with a fiber optic link for transmission along optical fiber path 16 to receiving gateway 18. Receiving gateway 18 reformats the data to a parallel HIPPI format for input to HIPPI interface 22. Interface 22 holds the data until high-performance computer 24 is ready to accept the data for processing. Data can likewise be communicated from high-performance computer 24 to high performance computer 10 through sending gateway 14', optical fiber path 16', and receiving gateway 18', where the components identified with primes perform the same function as the components identified with unprimed numbers. Note that both a sending and a receiving gateway are located at a each location and are packaged together in a preferred embodiment. As noted below, the sending and receiving gateways communicate to retain synchronous transmissions.

For ease of reference, the following acronyms are used in the detailed description:

| HIPPI - | High-Performance Parallel Interface | SONET - | synchronous optical network |
|---|---|---|---|
| MCN - | multiple crossbar network | FIFO - | first-in, first-out buffer |
| DTU - | data transport unit | COH - | communication overhead |
| TOH - | transport overhead | SPE - | synchronous payload envelope |
| POH - | path overhead | | |

Figure 2:
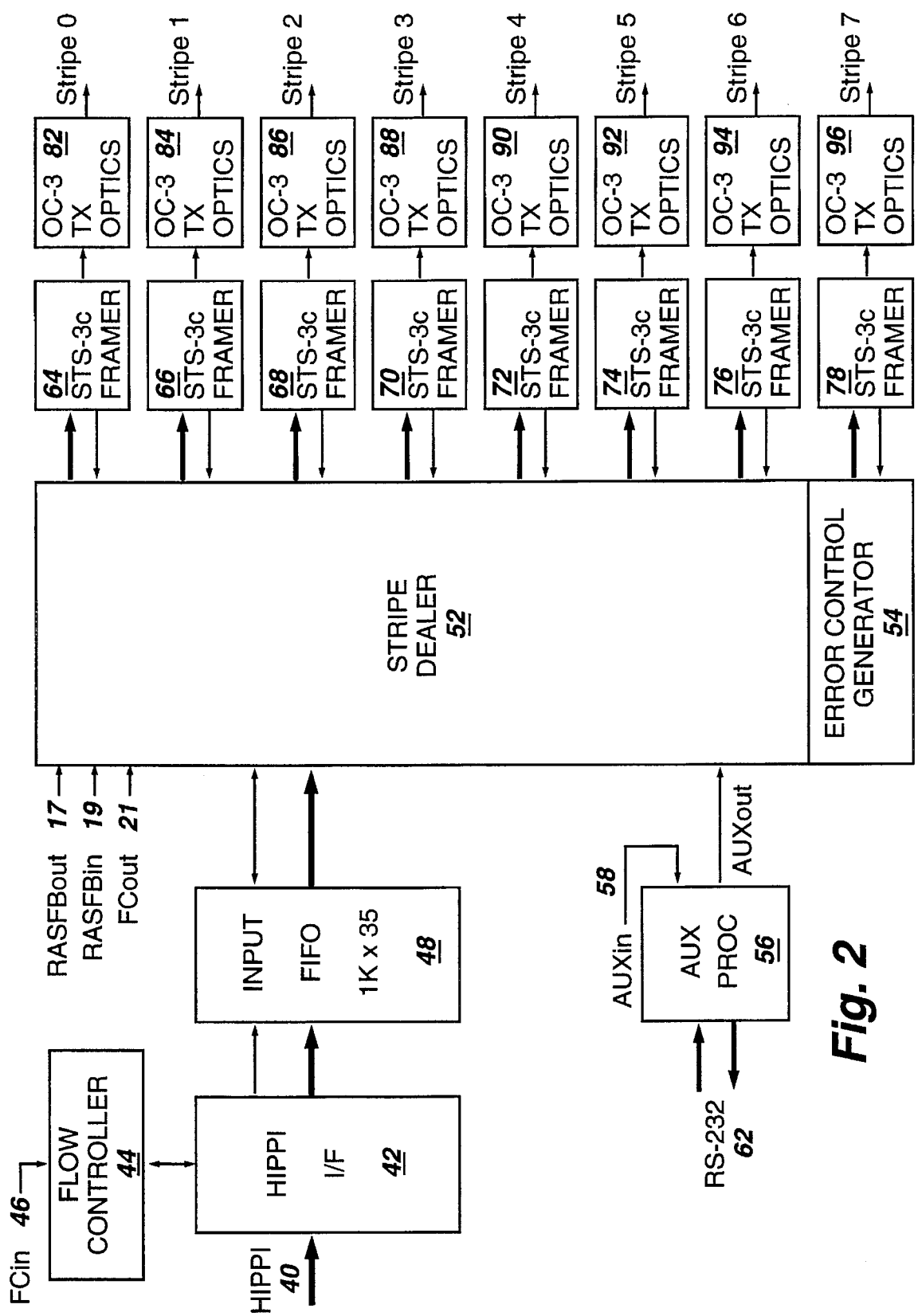
FIG. 2 is a block diagram of a HIPPI data transmitting system for use with SONET according to one embodiment of the present invention.
Figure 3:
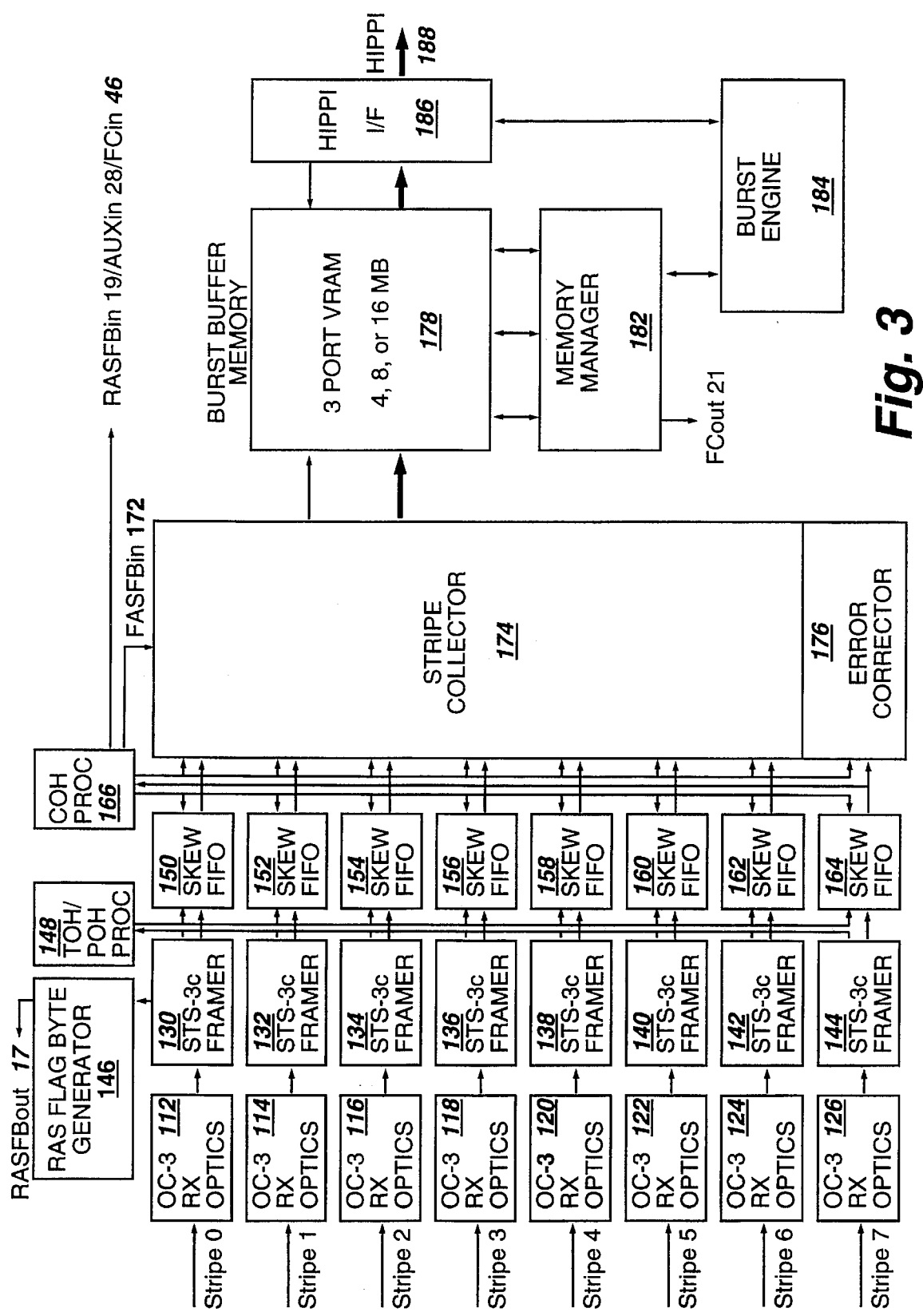
FIG. 3 is a block diagram of a SONET receiving system for outputting HIPPI transmitted data according to one embodiment of the present invention.

Referring now to FIGS. 2 and 3 there are seen block diagram representations of a sending gateway system and a receiving gateway system, respectively, of one embodiment of the present invention. The following description will discuss each of the individual components shown in FIGS. 2 and 3, first with reference to the sending gateway system shown in FIG. 2.

SENDING GATEWAY

HIPPI Interface 42

HIPPI interface 42 is a HIPPI destination interface for HIPPI input 40, which may be a high-performance computer or HIPPI switch. HIPPI interface 42 is not pad of the present invention and is included herein for completeness. Interface 42 terminates and receives differential emitter controlled logic (ECL) signals from HIPPI input 40 in accordance with the HIPPI-PH standard (St. John, supra) and translates these signals to voltage levels for input to transistor-to-transistor logic (TTL). The HIPPI destination (see HIPPI interface 42, FIG. 2) generates the HIPPI INTERCONNECT signal whenever the destination is powered. The HIPPI destination monitors INTERCONNECT from the attached computer or HIPPI switch and ignores all other signals if INTERCONNECT is false.

The HIPPI destination terminates HIPPI-PH waveforms (FIG. 4) for data transmission. A simple algorithm generates the HIPPI CONNECT signal: specifically, CONNECT is asserted if, upon REQUEST, the HIPPI destination detects from stripe dealer 52 that there is some transmission bandwidth to the destination (FIG. 3) and if parity on the I-Field (FIG. 4) is correct. If the HIPPI destination detects that there is no bandwidth available, i.e., the SONET link is down entirely, or if the I-Field has a parity error, then the HIPPI destination generates a rejected connection sequence. HIPPI is then terminated without passing CONNECT and READYs through the network link.

Interface 42 also accepts pulses from flow controller 4,4 and generates READYs, one for each pulse received. FCin 46 indicates the availability of burst buffer memory 178 (FIG. 3) of the receiving gateway 18 (FIG. 1) and flow controller 44 maintains a count of the data bursts that can be accepted at the HIPPI interface. Data flow control ensures that the receiving gateway has the capacity to receive transmitted burst data, as more particularly discussed with reference to FIG. 7. Interface 42 generates READYs in response to the stored pulse count, not to exceed three at one time.

Figure 4:
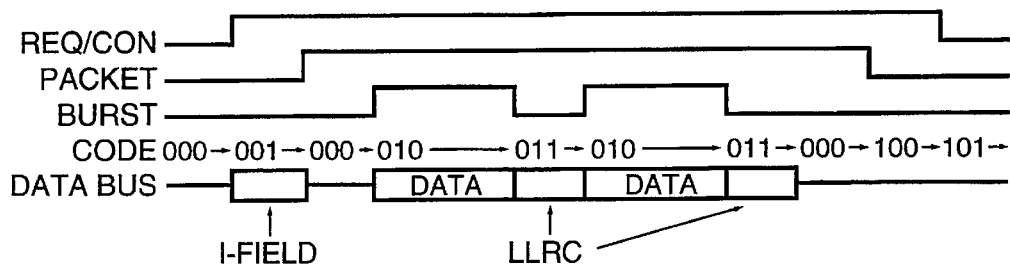
FIG. 4 illustrates a typical HIPPI signaling sequence.

HIPPI interface 42 also encodes the HIPPI control signals (FIG. 4). REQUEST, CONNECT, and READY are not communicated across the SONET link. When packets arrive at the receiving gateway (FIG. 3), a burst engine 184 generates a request to transfer the data to the receiving HIPPI interface 186.

All signals needed to regenerate the original HIPPI sequence are encoded into three bits with an extended meaning (see discussion of FIG. 5):

| CTL2 | CTL1 | CTL0 | Meaning |
|---|---|---|---|
| 0 | 0 | 0 | Discard |
| 0 | 0 | 1 | I-Field (new connection) |
| 0 | 1 | 0 | PACKET and BURST asserted (HIPPI data) |
| 0 | 1 | 1 | LLRC |
| 1 | 0 | 0 | PACKET end |
| 1 | 0 | 1 | Connection end |

HIPPI interface 42 packs bursts together with the minimal HIPPI inter-burst gap (3 words). Additional wasted HIPPI gap words are not transmitted. LLRC (Longitudinal Length Redundancy Checkword), which was generated in the attached computer, is not checked at the sending gateway, but is passed through to the receiving gateway.

FIG. 4 also indicates the encoding for a typical signaling sequence. During burst data, incoming parity is checked and if any error within each burst is detected a local LED is flashed and the subsequent LLRC is intentionally corrupted to convey the error to the receiving computer. Incoming HIPPI parity is discarded after checking and a single parity bit is generated over the entire word plus control bits. Data from HIPPI interface 42 is stored in a buffer 48, e.g., a 1K×36 bit wide FIFO buffer. FIFO 48 provides for timing adjustment between HIPPI interface 42 and stripe dealer 52 and provides for storage up to three full HIPPI bursts plus gaps (777 words). Flow controller 44 uses this FIFO 48 capacity to allow three READYs to be outstanding at any one time. Flow Controller 44

Flow controller 44 is responsible for monitoring FCin byte 46 from the local COH processor 166 (FIG. 3), which indicates the availability of additional burst buffers in remote burst buffer memory 178 (FIG. 3). To increase the reliability of flow control byte FCin 46 it is transmitted in every active stripe (COH; Byte 8). COH processor 166 monitors all stripes and takes a vote across all active stripes to determine the correct value of FCin 46. In this way, if an error causes the flow control byte to be corrupted for one stripe, the other stripes will override it. This voting scheme requires three or more active stripes to provide the desired protection.

Figure 7:
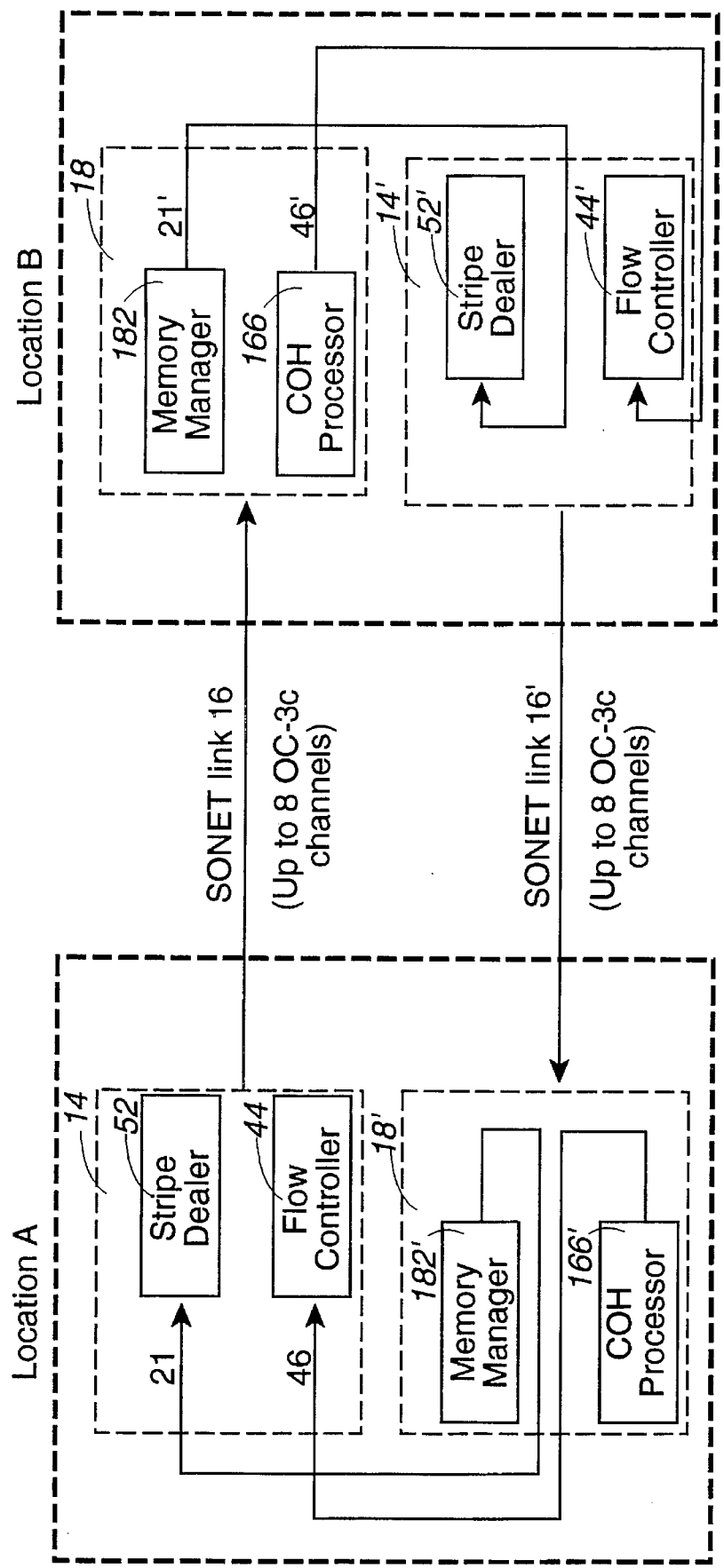
FIG. 7 is a block diagram illustration of system data flow control.

For each COH received in which FCin 46 is non-zero, flow controller 44 adds the FCin 46 byte to its remote burst buffer counter (BBCOUNT) to indicate the available buffer capacity at the receiving gateway (see also FIG. 7). Flow controller 44 also keeps track of the number of outstanding HIPPI READYs and the number of bursts in input FIFO 48 (FIFOCOUNT). With this information, HIPPI interface 42 generates READYs, three maximum at any one time, to keep the HIPPI channel 40 to the attached host busy. For each READY, the host can send one burst and, as it arrives, it is placed in input FIFO 48.

When stripe dealer 52 has removed a burst from input FIFO 48 to be sent to the receiving gateway, flow controller 44 decrements BBCOUNT and FIFOCOUNT. Removing a burst from input FIFO 48 also permits another READY to be generated.

In the event that the flow controllers 44 become out of synchronization, synchronization may be restored simply by resetting a single gateway with a Reset Gateway command generated by the auxiliary processor 56. Auxiliary Processor 56

Auxiliary processor 56 provides for remote control and performance monitoring. Auxiliary processor 56 is preferably implemented in a microprocessor mounted on each gateway circuit card and is shared by the sending and receiving gateways. Auxiliary processor 56 maintains configuration information, e.g., a mask which indicates which of the active channels should currently be used by stripe dealer 52. Processor 56 also maintains performance parameters, e.g., the condition of stripes in each direction and the number of data packets that are discarded. Individual parameters are discussed in the sections below.

```
Configuration Values
Source -        FASFB Mask (used to disable some or all active stripes)
                [Default=01]
Source -        Error Correction Enabled [Default-0; disabled]
Destination -   HIPPI Source Engine REQUEST→CONNECT time-out (CONTIM)
                (16 bits; 0=none; Max=42 ms.)
Commands
Reset Gateways
Enable Periodic Reset of Gateways
Open bi-directional RS-232 connection to terminal at other end (until break
        detected)
Parameters
Source - #Requests Received              Source - #Connections Granted
Source - #Packets Received               Source - #Bursts Received
Source - #Incoming HIPPI Parity          Source - FASFBout
        Errors
Source - Burst Buffer Count              Source - #Outstanding READYs
Source - #Bursts in Input FIFO
Destination - #Requests Made             Destination - #Connections Allowed
Destination - #Packets Sent              Destination - #Packets discarded
Destination - #Bursts Sent               Destination - FASFBin
Destination - #Frame Check Byte          Destination - #SPE Count Byte
        Errors                                   Errors
Destination - #Total Word Errors         Destination - #Uncorrectable Word
                                                 Errors
Destination - RASFBin                    Destination - RASFBout
```

Each auxiliary processor 56 communicates with the auxiliary processor at the other end of the link using the Auxiliary Data Channel 58 contained in the COH. Parameter values are supplied to stripe dealer 52 along AUXout 28. Locally, auxiliary processor 56 supports one RS-232 interface 62. A computer workstation, terminal or HIPPI tester can be connected at either end of the link to the RS-232 interface. A terminal can then access and set the system performance parameters. If a workstation is connected at both ends, the link can be configured to allow communications between the workstations where the baud rate at each end of the link is the same. Stripe Dealer 52

Stripe dealer 52 provides optimal use of the available fiber optic channels, hereinafter referred to as "stripes." As discussed above, a preferred SONET channel is the OC-3, so that six OC-3 channels, or stripes, are required to carry a full HIPPI bandwidth without error correction. A seventh stripe is required when error correction is desired.

One feature of the present invention, is that the gateways will operate with fewer functioning channels by reducing the throughput rate. The burst speed is the same, but the rate that bursts are accepted is reduced by controlling the READY signals. For a full 6- or 7-stripe configuration, full rate HIPPI is available. But the gateway can be operated down to one stripe (at least two stripes are required for error correction). A least-cost configuration on SONET can be selected when lower performance is required. If one or more stripes are not available for some reason, the gateway can adjust the throughput rate to accommodate the number of available stripes and return stripes to the configuration as they become available. In a preferred embodiment, an eighth stripe is available as a spare to replace a single channel which becomes unavailable.

The available data transfer rates (mega-bytes per second) are as follows:

| No. active stripes | Delivered data | Delivered data with correction | % HIPPI bandwidth | % with correction |
|---|---|---|---|---|
| 1 | 16.58 MB/sec | no correction | 16.77% | |
| 2 | 33.15 MB/sec | 16.58 MB/sec | 33.54% | 16.77% |
| 3 | 49.73 MB/sec | 33.15 MB/sec | 50.31% | 33.54% |
| 4 | 66.30 MB/sec | 49,73 MB/sec | 67.08% | 50.31% |
| 5 | 82.88 MB/sec | 66.30 MB/sec | 83.85% | 67.08% |
| 6 | 98.84 MB/sec | 82.88 MB/sec | 100% | 83.85% |
| 7 | 98.84 MB/sec | 98.84 MB/sec | 100% | 100% |

Figure 5:
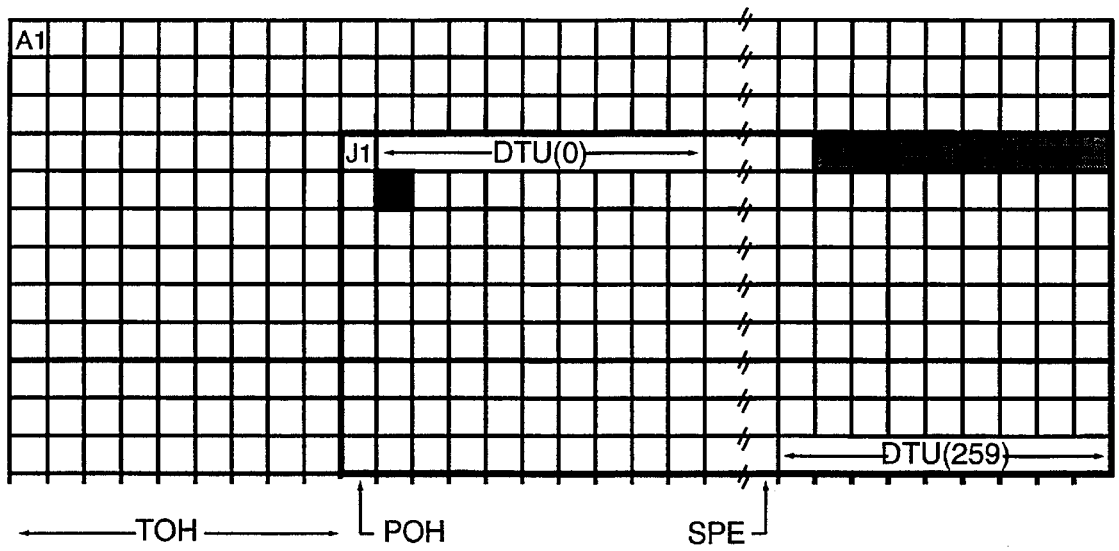
FIG. 5 is a diagram of a frame structure for HIPPI data transmission along SONET.

This technique is different than other inverse multiplexing arrangements where the input data throughput varies and the associated gateway adapts to this input rate by adjusting the number of utilized links to avoid wasting link bandwidth. In our adaptation, the desired input data throughput is always the same, namely 800 megabits/second to transmit the full HIPPI rate. Our invention uses one or several links to provide as much as possible of the full desired rate. The reasons for using less than the full number of required links is twofold: first, there may be fewer links available for practical or budgetary reasons, and second, some links may fail due to fiber breaks or interface card failures, and it is desirable to continue to pass as much HIPPI data as is possible, even in light of a reduction in available link bandwidth. In order to transmit the data over SONET the data must be framed in accordance with an appropriate protocol, here defined to be STS-3C for an OC-3 optical link. FIG. 5 depicts a SONET gateway frame structure, where the dashed area indicates a subsequent SONET frame. One frame is generated every 125 microseconds and can be viewed as 270 columns by 9 rows. Data is transmitted row-by-row, left-to-right. The first 9 columns (81 bytes) are used by the SONET transmission equipment and are the TOH; the remaining 261 columns (2349 bytes) are the SPE.

Figure 6:
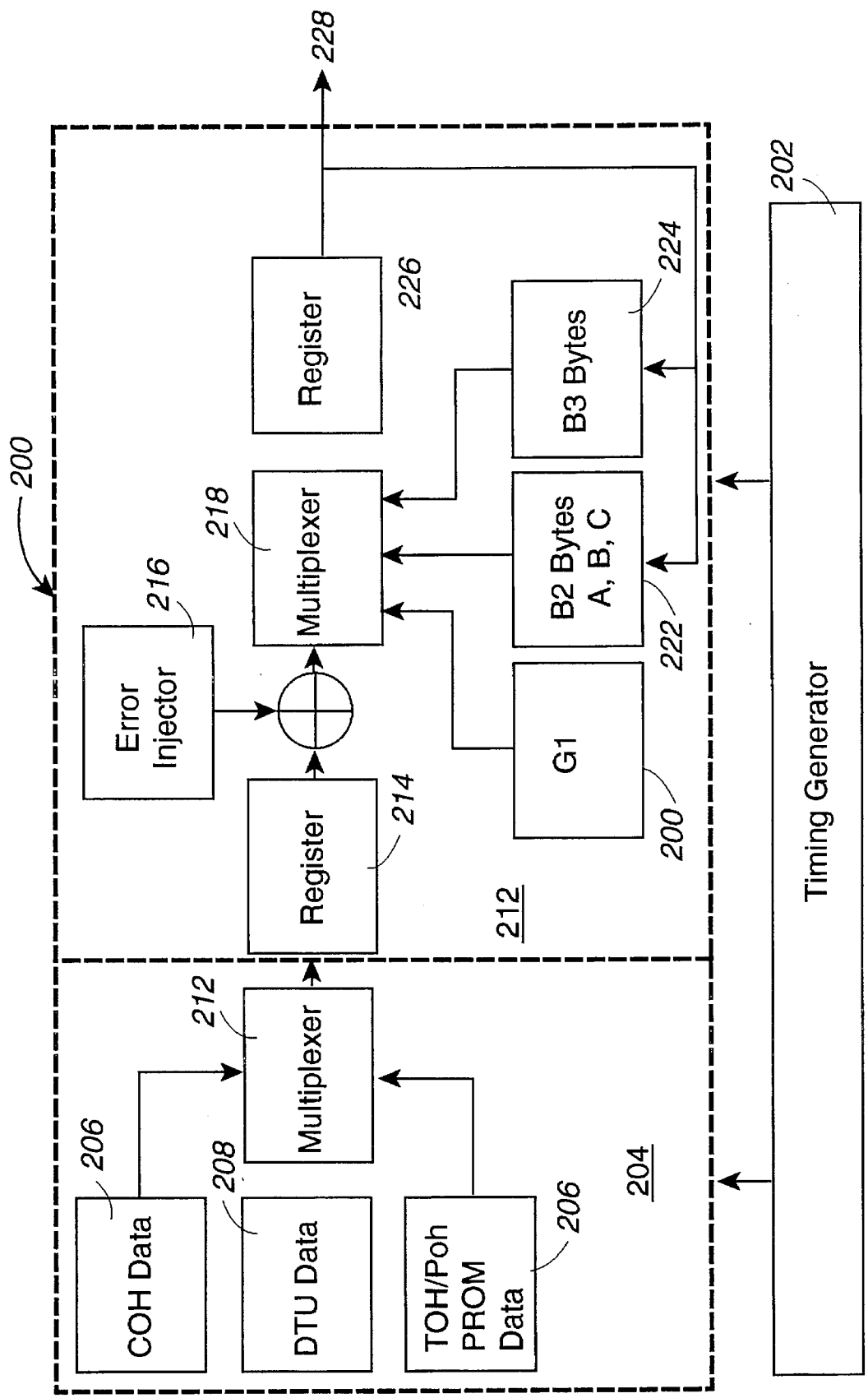
FIG. 6 is a block diagram schematic of the data transmission framer circuit.

The SPE typically spans two SONET frames, beginning in the tenth column of the fourth row. The tenth column (J1-9 bytes) is designated for use by the SONET transmission equipment and is the POH. Note that TOH and POH are defined by the ANSI SONET specifications, supra. The remaining 260 columns (2340 bytes) are available for use by the gateway. The gateway breaks the user portion of the SPE down into 260 9-byte DTUs, numbered DTU0-DTU259. DTU0 is the 9-byte COH. DTU1-DTU259 each carry two HIPPI words, i.e., each STS-3C SONET frame carries up to 518 HIPPI words. The TOH and POH are partially supplied by SONET framer ICs and partially supplied by programmable read-only memories (PROMs) located on each SONET framer 64, 66, 68, 70, 72, 74, 76, and 78 (FIG. 6). A PROM is used so that proper codes can be programmed to satisfy various brands of SONET terminal equipment.

The COH (DTU0) is a collection of gateway information to be transmitted between the sending and receiving gateways. The COH consists of 9 bytes as follows:

Byte 1   Frame Check Byte
A "02" is expected in this byte. This frame check is used by the destination to insure that, if the data is incorrectly framed, the SPE will be discarded.

Byte 2   SPE Count Byte
This count is incremented for each SPE transmitted. The destination checks to be sure that an SPE on any stripe has not been discarded by the SONET link by making sure that the SPE Count Byte is the same for all stripes.

Byte 3   Forward Active Stripe Flag Byte (FASFB)
A "one" in any bit position indicates that the corresponding stripe will be used for this SPE. The destination only interprets data on stripes so marked (e.g., 10110001 indicates that stripes 0,3,4 and 7 are being used).

Byte 4   Correction enabled
A "one" indicates correction will be passed from source to destination on the highest active stripe during this SPE.

Byte 5   Reverse Active Stripe Flag Byte (RASFB)
A "one" in any bit position indicates that the corresponding stripe is being received by the remote destination and that the stripe can be used for transmission during the next outgoing SPE.

Byte 6   Auxiliary Voice Channel (not shown)
An auxiliary voice channel may be included for remote debugging and maintenance of the gateway. This single byte is received 8000 times per second and is converted to an analog signal that is compatible with a standard telephone handset, if included.

Byte 7   Auxiliary Data Channel
The auxiliary data channel is used by the sending auxiliary processor 56 to communicate with the receiving auxiliary processor 56.

Byte 8   Flow Control Byte
A number (0–255) indicating the quantity of additional Burst Buffers available.

Byte 9   Reserved

Stripe Dealer 52 spreads incoming HIPPI words and reduced control down into nine bytes per each of the two HIPPI words. These bytes are assigned to individual DTUs. The mapping is as follows:

| | |
|---|---|
| HIPPI Data Word i Byte 0 | DTUx byte 0 |
| HIPPI Date Word i Byte 1 | DTUx byte 1 |
| HIPPI Data Word i Byte 2 | DTUx byte 2 |
| HIPPI Data Word i Byte 3 | DTUx byte 3 |
| Control Byte | DTUx byte 4 |
| HIPPI Data Word i +1 Byte 0 | DTUx byte 5 |
| HIPPI Data Word i +1 Byte 1 | DTUx byte 6 |
| HIPPI Data Word i +1 Byte 2 | DTUx byte 7 |
| HIPPI Data Word i +1 Byte 3 | DTUx byte 8 |

The format of the Control Byte is:

| | |
|---|---|
| Bit 7 | Word i+n Odd Parity (across Word i+n data and 3 control bits) |
| Bit 6 | Word i+n Control bit 2 |
| Bit 5 | Word i+n Control bit 1 |
| Bit 4 | Word i+n Control bit 0 |
| Bit 3 | Word i Odd Parity (across Word i data and 3 control bits) |
| Bit 2 | Word i Control bit 2 |
| Bit 1 | Word i Control bit 1 |
| Bit 0 | Word i Control bit 0 |

Pairs of HIPPI words are "dealt" by stripe dealer 52 to alternate available stripes, with one pair going to the DTU for each stripe. The availability of a particular stripe during each SPE is determined by the RASFB found in the last incoming COH.

ERROR CONTROL GENERATOR 54

Error correction can be optionally enabled if two or more stripes are active. Error control generator 54 generates odd parity (total number of "ones" in the word is odd) across "N1" active stripes and supplies that parity to the largest numbered active stripe. For example: Bit position 0 of the parity strip is computed as odd parity across all of the bit 0 positions of all other active stripes. The stripe parity is used for error correction by error corrector 176. in the receiving gateway, as explained below. The generation of a parity word, or "syndrome," for use in correcting transmitted word errors is a feature of the present invention and is more particularly discussed with reference to the section labeled ERROR CORRECTION.

STS3C FRAMERS 64–78 TRANSMIT FUNCTION

There are eight STS3C framers 64–78. Each framer 64–78 contains the transmitter/SONET interfaces. Each framer 64–78 logic generates portions of the TOH and POH and accepts the SONET payload inputs from stripe dealer 52. The logic encodes the signal for DC balance using the standard scrambling scheme described in the ANSI SONET specifications, supra, and then serializes the stream. The output from the transmit portion of each framer 64–78 is a serial bit stream at 155.52 MHz.

FIG. 6 is a schematic in block diagram format of a system for framing the data to be output for transmission along an available channel. The particular nomenclature is applicable to the transmission of HIPPI burst data along a SONET link, but other suitable data sources and transmission protocols can be utilized with appropriate programming. The framing system 200 includes timing generator 202, data multiplexer 204, and framer 212. Timing generator 202 provides timing signals to clock logic circuitry in the component parts to framing system 200. Data multiplexer 204 receives overhead and HIPPI data forming the data frame shown in FIG. 5. DTU data input 208 is multiplexed with COH data input 206 and TOH/POH data input 210 through multiplexer 212. The COH data is formed from gateway operating parameters. TOH/POH data is determined by the transmission system protocol, here SONET, and the PROM may be changed to accommodate other SONET vendors equipment.

Framer 212 accepts the multiplexed data from multiplexer 204 into register 214. The SONET specification, supra., defines the bytes identified as G1 220, B2 bytes A, B, and C 222, and B3 byte 224. Multiplexer 218 then forms a data frame, e.g., a SONET data frames, for storage in register 226 until clocked out onto an available stripe. Error injector 216 is provided to purposefully inject an error bit to test the error correction system.

OC3 TX OPTICS (82–96)

Each STS-3 C transmitter framer 64–78 supplies its 155.52 MHz serial bit stream to a corresponding optical transmitter module 82–96. Optical modules 82–96 are compatible with the SONET OC3 Optical Interface Specification for Single-Mode (ANSI T1.106-1988). Optical modules 82–96 convert the electrical digital serial data stream to an optical signal data stream that is provided along parallel stripes 0–7 to SONET Terminal Equipment (not shown) supplied by the telecommunication carrier.

Referring now to the receiving gateway system shown in FIG. 3, the component parts are again described.

Receiving Gateway

OC-3 RX OPTICS(112–126)

Eight OC-3 stripes 0–7 are applied at the receiving gateway to eight optical receiver OC-3 modules 112–126. Optical modules 112–126 are also compatible with the SONET OC-3 Optical Interface Specification for SingleMode (ANSI T1.106-11988) and interface through fiber optic connectors. Optical modules 112–126 receive the optical signal from the SONET terminal equipment (not shown) supplied by the telecommunications carrier and convert the serial optical data stream to an electrical serial data stream.

Sts-3C FRAMERS-RECEIVE FUNCTION

The serial data and clock bit from each one of the optical receiver modules 112–126 are provided to the STS-3 C framers 130–144. Synchronizer ICs, e.g., TransSwitch SYN155 STS-3C, provide serial-to-parallel conversion, unscrambling of data, and frame detection. Programmable logic devices (PLDs) provide other functions such as generating one bit for RASFB out 17. The output to RASFB generator 146 is an indication from each stripe that the stripe is fully operational and is receiving SONET data correctly. Generator 146 combines the individual indications to form a single byte RASFBout 17 for signaling to the sending gateway. Byte-wide parallel data is provided at the output of each framer 130–144. A control signal is added to indicate the beginning of an SPE.

TOH-POH PROCESSOR

TOH-POH Processor 148 receives the output from framers 130–144 and detects the overhead bytes containing the TOH and POH bytes. These bytes are not required after framing is complete and they are removed by processor 148. The remaining useful data are then input to skew FIFOs 150–164.

STRIPE SKEW ADJUSTMENT FIFOS

The data output from each framer module 130–144 is input to a separate 9-bit-wide skew FIFO buffer 150–164. Data is clocked into each FIFO 150–164 only if the associated framer 130–144 indicates that the incoming signal is framed and that the data byte is in the DTU area of the SPE frame (e.g., not the POH area). COH processor 166 monitors the incoming COH and outputs a signal FASFBin 172 to stripe collector 174 to indicate which stripes contain data.

The purpose of FIFOs 150–164 is to accommodate time-of-arrival variations in each of the individual OC-3 stripes 0–7. Time-of-arrival variations occur from time-of-flight variations, arising from slight differences in optical fiber lengths, and synchronization variations, where the various stripes are not synchronized at the same time after a reset operation. It is expected that the maximum time-of-flight variation between the slowest and fastest stripes will be very small (e.g., about 2.85 microseconds for a 2000 km fiber length, corresponding to 53 Bytes at 155.52 MHz transmission rate). The FIFOs and logic allow for a large delay after reset for all of the active stripes to become synchronized in the SONET section and then to allow for alignment of the data beginning after that time. In a prototype embodiment, a FIFO is selected with extra capacity (e.g., 4096 byte capacity vs. 53 bytes required) to allow for unexpected skew between the stripes and to accommodate longer runs of optical fiber between gateways.

REVERSE ACTIVE STRIPE FLAG BYTE GENERATOR (RASFB)

The RASFB generator 146 generates the value to be transmitted in COH Byte 5. Generator 146 monitors each of the eight STS-3C framers 130–144 to determine the value of the RASFBout 17. Generator 146 places a "one" in each bit position for each stripe that is being received and framed correctly to form RASFBout 17, where, after being sent through the link, it becomes RASFBin 19 for use by stripe dealer 52 (FIG. 2). Stripe dealer 52 receives RASFBin 19 and determines the stripes to use for the next SPE. FASFBin 172 is generated by the receiving gateway to identify the stripes that in fact are being used for the upcoming received SPE. Voting logic (across all active stripes received) is used by the receiving gateway to determine the correct value of FASFBin 172, i.e., the stripes that were actually used by the sending gateway.

COH PROCESSOR 166

COH processor 166 handles removal of the COH from skew FIFOs 150–164. Processor 166 first verifies framing by checking the Frame Check Byte for all stripes. If "02" is not received, the gateway is reset. Processor 166 further extracts FASFBin 172, the correction enabled flag, RASFBin 19, auxiliary voice channel (not shown), AUXin 58 and FCin 46 from each stripe. To increase reliability, each value is the result of a vote taken across all functioning stripes.

FASFBin 172 is provided to stripe collector 174 to notify it which stripes are to be used for the current SPE. RASFBin 19 is provided to the local stripe dealer (see dealer 52, FIG. 2) so that it can determine which stripes are to be used for sending data in the reverse direction. AUXin 58 is provided to the local auxiliary processor (see processor 56, FIG. 2). FCin 46 is provided to the flow controller (see controller 44, FIG. 2).

STRIPE COLLECTOR 174

As DTU bytes become available across active stripes (as indicated by "not empty" on skew FIFOs 150–164 for which FASFBin 172 indicates activity) stripe collector 174 clocks the bytes out of the skew FIFOs 150–164 to stripe collector 174. Stripe collector 174 rebuilds the bytes into 36-bit words: 32 bits of data, 3 bits of encoded control, and 1 parity bit across the other 35 bits. All words from each stripe are applied to error corrector 176. Stripe collector 174 checks parity for each 36-bit word on each active stripe, and generates a signal for each word of the DTU if that word is corrupted.

ERROR CORRECTOR 176

If error correction is enabled, error corrector 176 constructs a syndrome from all active channels including the error correction channel. That syndrome can be used to correct a single word that was corrupted for each half of each DTU. If none of the stripes has a parity error during the current word, i.e., the measured parity is the same as the transmitted parity, then the words are passed as-is to burst buffer memory 178. If only one of the stripes has a parity error during the current word, then that word can be corrected unless the parity stripe also has a parity error on that same word. To correct the flawed word, the corrupted word is combined with the computed syndrome. Suitable error correction schemes are described in U.S. Pat. No. 5,208,813 for correcting single stripe data errors. Real time data correction, according to one aspect of the present invention, is discussed below.

With a single-bit error on one stripe, the error can be corrected. The received word is marked as bad and a new word is inferred from the correctly received words on stripes 0 and 2. If more than one of the stripes has a parity error during the current word, then the word cannot be reconstituted and the word is marked as "bad" using the 36the bit in burst buffer memory 178. The HIPPI interface will subsequently force bad parity for those marked words in the resulting HIPPI data stream.

As words are moved from error corrector 176 to burst buffer memory 178, the three encoded control bits are evaluated. In the case of a 000 code, the word is discarded. The 000 Discard code is used for words that are transmitted to maintain synchronous operation of the system and which do not contain actual data. In the case of a 001 code, the word is written to the memory manager 182 action FIFO, marked as an I-Field. For a 010 code, the word is written to burst buffer memory 178. For a 011 code, the word is written to memory manager 182 action FIFO, marked as LLRC. In the case of a 100 code, the word is written to memory manager 182 action FIFO marked as packet end In the case of a 101 code, the word is written to memory manager 182 action FIFO marked as connection end.

BURST BUFFER MEMORY AND MEMORY MANAGER

In this section, dynamic RAMs are used to emulate a 4 megabyte FIFO. Triple-port VRAMs sustain the needed input and output bandwidth to and from the buffers. The VRAM is managed as a large circular buffer. Entries in the buffer are bursts.

Memory manager 182 maintains a list of burst pointers, one for each burst that has been received. This list is stored in a 4K FIFO. As bursts are removed from burst buffer memory 178 by the destination HIPPI interface 186, their pointers are removed from the list so that the buffers can be reused. I-Fields, LLRC for each burst, packet end, and connection end are stored in a separate 16K action FIFO in memory manager 182 whose depth allows for up to 4096connections, each consisting of a single burst. Memory manager 182 also generates FCout 21, the availability of memory in burst buffer memory 178. FCout 21 is provided to local stripe dealer 52 and, after traversing the link in the COH, is an output to flow controller 44 as FCin 46 (all FIG. 2).

BURST ENGINE 184

Burst engine 184 monitors memory manager 182 to determine if a full burst is available in RAM. When it is, burst engine 184 signals HIPPI interface 186 to make a connection using the I-Field indicated by memory manager 182. If a connection is made, burst engine 184 sends all HIPPI bursts associated with that connection via HIPPI interface 186 out on HIPPI channel 188. Depending on the camp-on bit in the I-Field, the adjacent crossbar switch may reject the connection if the destination is busy, or may camp-on waiting for a chance to make the connection. In either case a timer is set in burst engine 184 that determines how long it will wait for the connection to succeed. If camp-on is enabled, burst engine 184 will just wait for CONNECT or until the timer expires. If camp-on is disabled, burst engine 184 will retry to make a connection until a connection is made or the timer expires.

If the connection is made, burst engine 184 provides all HIPPI bursts associated with that connection via HIPPI interface 186. If the timer expires, burst engine 184 discards all HIPPI bursts associated with that connection.

HIPPI INTERFACE 186

HIPPI interface 186 generates fresh byte-parity for each HIPPI word as it is sent from burst buffer memory 178. If the 36th bit is set on any word, it forces bad parity on bytes 0 and 1. HIPPI interface 186 decodes the control bits to regenerate the original HIPPI sequence that was received. HIPPI interface 186 converts the TTL data to provide ECL signals per the HIPPI specification.

DATA FLOW CONTROL

One particular aspect of this invention for the transmission of high speed data along slower speed parallel stripes is the need to control the flow of data so that buffer memory capacity is available at the receiving gateway. The discussion included the generation of the flow control byte FCin 46 (FIGS. 2 and 3). FIG. 7 more particularly depicts a system in block diagram form for providing a "credit based" flow control for the gateways. The numbers in FIG. 7 are the same as the same components in FIGS. 2 and 3.

Flow control must be communicated from each Receiving Gateway 18 to its Sending Gateway 14 located at a remote location. This operation must be repeated for each direction because data transmission operations, such as HIPPI, are not necessarily symmetrical. In the following description, all references are for operation in one direction, but flow control operation for the opposite direction works similarly.

Flow control information is sent from the Receiving Gateway 18, such as location B, to a Sending Gateway, such as location A, by using a small amount of the transmission bandwidth in the reverse direction when data is transmitted from the Sending Gate 14' at location B to the Receiving Gateway 18' at location A. Note that the gateways require a full duplex operation, although dummy data may be transmitted that is discarded at a Receiving Gateway. In particular, one byte of the COH is used per frame (byte 8 as discussed above). It is not adequate to send a direct command such as a 0/1 in this byte because that would permit at most one send command, e.g., a READY command, to be communicated per SPE. To sustain a full HIPPI rate, e.g., it is necessary to send information indicating the availability of new available burst buffers by memory manager 182. To accomplish this, the byte is treated as a count, or credit, which indicated to remote flow controller 44 the availability of as many as 255 burst buffers per SPE.

Whenever Memory Manager 182 is clocked to output information on newly available burst buffers, the accumulated credit count is provided to Stripe Dealer 52' in Sending Gateway 14' as credit count 21'. Credit count 21' then forms the Flow Control Byte in the COH portion of the SPE transmitted by Stripe Dealer 52'.

At Receiving Gateway 18', the COH is voted on by COH Processor 166' and the elected FCin 46 is delivered to Flow Controller 44. Flow Controller 44 adds the count to the burst buffer memory to maintain a credit for the available free burst buffers at Receiving Gateway 18. As noted above, the receipt of a READY signal from a HIPPI interface and the indication of available burst buffers in the Receiving Gate will enable a data burst to be transmitted from Sending Gateway 14. Thus, a Sending Gateway is always "aware" of the amount of burst buffer memory available at a Receiving Gateway and transmits data only when adequate burst buffer is available.

ERROR CORRECTION

It is a feature of the present invention to provide for correcting errors in transmitted words, where an error correction parity syndrome is prepared across all of the stripes in parallel with forming a SPE. The Stripe Dealer runs faster than the Tx Framers and will construct DTUs and wait for a signal from the Framers to transfer data. While the Tx Framers are unloading the DTUs the Stripe Dealer is constructing the next set of DTUs in parallel. The syndrome is formed as the DTUs are constructed so that no transmission time is lost.

The following example illustrates the construction of a syndrome across three stripes (Stripes 0, 1, 2) with Stripe 2 selected to be the Error Correction Stripe and Stripes 0 and 1 being the data stripes. Given the following HIPPI data, Control, and Parity over the data/control portion. All values in this table are expressed in hexadecimal. PC is the combined PARITY/CONTROL A complete DTU for each stripe is constructed using two HIPPI words along with their associated control and parity. This DTU structure yields 9 bytes of information per DTU.

| Data | HIPPI DATA | CONTROL | PARITY | PC |
| --- | --- | --- | --- | --- |
| word 0 | 1010 1010 1010 1010 1010 1010 1010 1010 | 010 | 0 | 0010 |
| word 1 | 0000 0000 0000 0000 0000 0000 0000 0000 | 000 | 1 | 1000 |
| word 2 | 0000 0000 0000 0001 0000 0000 0000 0001 | 010 | 0 | 0010 |
| word 3 | 1000 0000 0000 0000 1000 0000 0000 0000 | 010 | 0 | 0010 |
| Time Unit | 0 | 1 | 2 | 3 |

-continued

| Stripe 2 | DTU(LO)  | DTU(LO) | DTU(HI) | DTU(HI) |
|----------|----------|---------|---------|---------|
| Stripe 1 |          | word 1  |         | word 3  |
| Stripe 0 | word 0   |         | word 2  |         |

Therefore, the equation for construction of the syndrome is:

$$Q(n)=INV\{INV[D(n)]XOR\ Q(n-1)\}$$

where D(n) is the nth DTU being constructed; Q(n-1) is the word stored in the syndrome accumulator; and Q(n) is a new syndrome being constructed. At the start of each DTU construction cycle, the syndrome accumulator is cleared.

```
Time Unit 0 Constructing DTU(LO) - 1st half of DTU
stripe 0 - word 0 (HIPPI Data I PC):
         1010 1010 1010 1010 1010 1010 1010 1010 I 1 010
stripe 1 - Not Enabled
stripe 2 -
INV(     1010 1010 1010 1010 1010 1010 1010 1010 I 0 010   )
XOR      0000 0000 0000 0000 0000 0000 0000 0000 I 0 000

0101 0101 0101 0101 0101 0101 0101 0101 I 1 101
Time Unit 1 Constructing DTU(LO) 1st half of DTU:
stripe 0 - Not Enabled
stripe 1 - word 1 - 0000 0000 0000 0000 0000 0000 0000 0000 I 1 000
stripe 2 -
INV(     0000 0000 0000 0000 0000 0000 0000 0000 I 1 000   )
```

-continued

```
XOR      0101 0101 0101 0101 0101 0101 0101 0101 I 1 101

1010 1010 1010 1010 1010 1010 1010 1010 I 1 010
Completed syndrome word for DTU(LO), inverted to next stage!
Time Unit 2 Constructing DTU(HI) 2nd half of DTU:
stripe 0 - word 2:
         0000 0000 0000 0001 0000 0000 0000 0001 I 0 010
stripe 1 - Not Enabled
stripe 2 -
INV(     0000 0000 0000 0001 0000 0000 0000 0001 I 0 010   )
XOR      0000 0000 0000 0000 0000 0000 0000 0000 I 0 000

1111 1111 1111 1110 1111 1111 1111 1110 I 1 101
Time Unit 3 Constructing DTU(HI) 2nd half of DTU
stripe 0 - Not Enabled
stripe 1 - word 3:
         1000 0000 0000 0000 1000 0000 0000 0000 I 0 010
stripe 2 -
INV(     1000 0000 0000 0000 1000 0000 0000 0000 I 0 010   )
XOR      1111 1111 1111 1110 1111 1111 1111 1110 I 1 101

1000 0000 0000 0001 1000 0000 0000 0001   0 000
Completed syndrome word for DTU(HI), inverted to next stage.
```

When the data and syndrome DTUs are moved into the Tx Framer byte disassembly register, the syndrome DTU is inverted. This results in the following syndrome DTU values for transmission:

```
DTU(0) - 0101 0101 0101 0101 0101 0101 0101 0101 I 0 101
DTU(1) - 0111 1111 1111 1110 0111 1111 1111 1110 I 1  111
```

If, during transmission, stripe 0 DTU(LO) has a bit hit at bit position 0 (word 0, now 1010 1010 1010 1010 1010 1010 1010 1011 I 1 010) the collector will detect the incorrect parity and flag this word for correction. During reconstruction of the HIPPI data stream at a Receiving Gateway the Error Corrector monitors the error flag and provides the correction if it is set.

A new syndrome is computed on the collector side of the receiving interface. This new syndrome is used to facilitate correction. DTUs are constructed in parallel for all active channels. The syndrome generator simply constructs DTUs for all active channels and simultaneously computes the new syndrome. For this case:

```
DTU(0)
1010 1010 1010 1010 1010 1010 1010 1011 I 0 010 -   word 0 - error
0000 0000 0000 0000 0000 0000 0000 0000 I 1 000 -   word 1 - no error
0101 0101 0101 0101 0101 0101 0101 0101 I 0 101 -   syndrome - no error 1111 1111 1111 1111 1111 1111 1111 1110 I 1 111 -   new syndrome
DTU(1)
0000 0000 0000 0001 0000 0000 0000 0001 I 0 010 -   word 2 - no error
1000 0000 0000 0000 1000 0000 0000 0000 I 0 010 -   word 3 - no error
0111 1111 1111 1110 0111 1111 1111 1110 I 1 111 -   syndrome - no error 1111 1111 1111 1111 1111 1111 1111 1111 I 1 111 -   new syndrome
```

Once DTUs are constructed, the data is moved up to the next stage of the pipeline where the HIPPI data stream is recreated and error correction is accomplished. As HIPPI data words are moved into this stage the correction flag is monitored and, if it is set, the data word is XORed with the inverted version of the new syndrome word:

```
          1010 1010 1010 1010 1010 1010 1010 1011 I 0 010
XOR{ INV( 1111 1111 1111 1111 1111 1111 1111 1110 I 1 111)

1010 1010 1010 1010 1010 1010 1010 1010 I 0 010
``` which is the correct data that originated from the Sending Gateway.

Thus, a system of gateways has been provided for sending high bandwidth data signals over long distances using a relatively lower bandwidth fiber optic link to provide a wide-area HIPPI network. While the embodiment discussed above is exemplified in terms of transmission of HIPPI data over a SONET fiber optic link, it will be understood that other fiber optic links and protocol can be implemented with the data stripe distribution and collection apparatus discussed above and that the present invention is not limited to use with HIPPI and SONET.

Each of the above component blocks is readily formed from commercial integrated circuit components and microprocessor components by persons of ordinary skill in the electronics art based on the functional description hereinabove set forth. Further, while individual components might be used, much of the electronics might be incorporated into a VLSI circuit.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system of sending and receiving gateways to interconnect high speed data interfaces through a fiber optic link, comprising:

an electronic stripe dealer for distributing bytes of data from a first interface at said sending gateway onto parallel fiber optics comprising said fiber optic link to form transmitted data;

a first error correction module including first processor means for forming an accumulated parity syndrome across data words distributed onto said parallel fiber optics, where said accumulated parity syndrome is transmitted in parallel with data words forming said parity syndrome;

an electronic stripe collector for receiving said transmitted data on said parallel fiber optics and reforming said data into a format effective for input to a second interface at said receiving gateway; and a second error correction module including second processor means for forming a second parity syndrome as said transmitted data is reformed into said data words with comparison logic for comparing said first parity syndrome with said second parity syndrome to detect an error in a transmitted word, and computer logic for reconstructing a word having an error.

2. A system according to claim 1, further including a first auxiliary processor in said receiving gateway for maintaining first connection configuration information at said receiving gateway; a second auxiliary processor in said sending gateway for generating second connection configuration information for use by said first auxiliary processor; and data transmission means connecting said first and second auxiliary processor whereby said second auxiliary processor is in communication with said first auxiliary processor.

3. A system according to claim 1, further including a flow controller module in said sending gateway the monitoring the availability of buffer capacity in said receiving gateway and signaling said stripe dealer circuitry to transmit data when said buffer capacity is available.

4. A system according to claim 1, wherein said electronic stripe dealer further includes stripe selection means for selecting operable ones of said parallel fiber optics for data transmission.

5. A system according to claim 1, wherein said electronic stripe collector further includes stripe monitoring means for determining operable ones of said parallel fiber optics for data reception.

6. A system of sending and receiving gateways to interconnect high speed data interfaces through a fiber optic link, comprising:

an electronic stripe dealer for distributing bytes of data from a first interface at said sending gateway onto parallel fiber optics comprising said fiber optic link to form transmitted data; and an electronic stripe collector for receiving said transmitted data on said parallel fiber optics and reforming said data into a format effective for input to a second interface at said receiving gateway;

wherein said sending gateway includes a flow controller module for monitoring the availability of buffer capacity in said receiving gateway dealer to transmit data when said buffer capacity is available.

7. A system according to claim 6, wherein said electronic stripe distributor futher includes stripe selection means for selecting operable ones of said parallel fiber optics for data transmission.

8. A system according to claim 6, wherein said electronic stripe collector further includes stripe monitoring means for determining operable ones of said parallel fiber optics for data reception.

9. A system of sending and receiving gateways to interconnect high speed data interfaces through a fiber optic link, comprising:

an electronic stripe dealer for distributing bytes of data from a first interface at said sending gateway onto parallel fiber optics comprising said fiber optic link to form transmitted data; and an electronic stripe collector for receiving said transmitted data on said parallel fiber optics and reforming said data into a format effective for input to a second interface at said receiving gateway wherein said electronic stripe dealer further includes stripe selection means for selecting operable ones of said parallel fiber optics for data transmission; and said electronic stripe collector further includes stripe monitoring means for determining operable ones of said parallel fiber optics for data reception.

10. A system according to claim 9, further including a first error corrector including a first computer means for forming an accumulated parity syndrome across data words distributed onto said parallel fiber optics, where said accumulated parity syndrome is transmitted in parallel with data words forming said parity syndrome; and a second error corrector including a second computer processor for forming a second parity syndrome as said transmitted data is reformed into said data words; comparison circuitry for comparing said first parity syndrome with said second parity syndrome to detect an error in a transmitted word; and a third computer means for reconstructing a word having an error.

* * * * *